US009690547B1

(12) United States Patent
Dow et al.

(10) Patent No.: US 9,690,547 B1
(45) Date of Patent: Jun. 27, 2017

(54) DYNAMIC SETUP OF DEVELOPMENT ENVIRONMENTS

(71) Applicant: International Business Machines Corporation, Armonk, NY (US)

(72) Inventors: Eli M. Dow, Wappingers Falls, NY (US); Thomas D. Fitzsimmons, Poughkeepsie, NY (US); Emily M. Metruck, Poughkeepsie, NY (US); Charles J. Stocker, IV, Plainsboro, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/973,866

(22) Filed: Dec. 18, 2015

(51) Int. Cl.
G06F 9/44 (2006.01)
G06F 9/45 (2006.01)

(52) U.S. Cl.
CPC . *G06F 8/30* (2013.01); *G06F 8/41* (2013.01)

(58) Field of Classification Search
None
See application file for complete search history.

(56) References Cited

U.S. PATENT DOCUMENTS

| 7,340,726 | B1 | 3/2008 | Chelf et al. | |
|---|---|---|---|---|
| 2004/0158811 | A1* | 8/2004 | Guthrie | G06F 8/20 717/103 |
| 2008/0270983 | A1* | 10/2008 | Ahadian | G06F 8/33 717/113 |
| 2010/0281461 | A1* | 11/2010 | Tyler | G06F 8/41 717/106 |
| 2010/0293523 | A1* | 11/2010 | Ahadian | G06F 8/10 717/108 |
| 2011/0191747 | A1* | 8/2011 | Charisius | G06F 8/20 717/103 |
| 2014/0289738 | A1* | 9/2014 | Paliwal | G06F 8/38 719/311 |
| 2015/0363292 | A1* | 12/2015 | Shiraishi | G06F 11/3604 717/125 |

FOREIGN PATENT DOCUMENTS

WO 2011076972 A1 6/2011

OTHER PUBLICATIONS

Eli M. Dow, et al., "Dynamic Setup of Development Environments", U.S. Appl. No. 15/072,380, filed Mar. 17, 2016.
List of IBM Patents or Patent Applications Treated as Related; (Appendix P), Filed Apr. 6, 2016; 2 pages.
Freescale, [online]; [retrieved on Jun. 11, 2008]; retrieved from the Internet http://www.freescale.com/training/online-academy/codewarrior-compiler-settings:WBT_24606#. Han et al., "CodeWarrior Compiler Settings " Jun. 21, 2004, 11 pgs.

* cited by examiner

*Primary Examiner* — Philip Wang
(74) *Attorney, Agent, or Firm* — Cantor Colburn LLP; Steven Chiu

(57) ABSTRACT

A computer-implemented method includes receiving a request from a user at a local machine to access a project. One or more programming languages used in the project are identified. Resource availability at the local machine is analyzed. An integrated development environment (IDE) is selected for the project, based at least in part on the one or more programming languages and the resource availability of the local machine. The IDE is provisioned automatically, by a computer processor, for the user in response to the request to access the project.

13 Claims, 8 Drawing Sheets

DYNAMIC SETUP OF DEVELOPMENT ENVIRONMENTS

BACKGROUND

Embodiments of the present invention relate to development environments and, more specifically, to dynamic setup of development environments.

Often, programmers need to set up development environments for their projects, where a project can include software source code, associated metadata, build instructions, compiler and linker settings and preferences, scripts, and packaging necessary to build or deploy software source code as an executable. When setting up the development environment, programmers must make decisions that will impact their productivity. These decisions include selection of an integrated development environment (IDE) (e.g., Eclipse, NetBeans, XCode, or Visual Studio), a platform to support the codebase of the project, and other options. Problems can arise if a programmer makes a mistake in these decisions. For instance, the code of the project may not compile.

These decisions are not always straight forward, especially for novice programmers. Novice programmers may not know that different IDEs can have different resource consumption and strengths toward certain codebases. For instance, a codebase with ten thousand lines of code in Java or with mixed languages is likely more suited to a heavy weight IDE, such as Eclipse. In contrast, given a codebase with five hundred or fewer lines in pure Java, it might make more sense to select a lighter weight IDE, such as BlueJ.

Further, different computing devices can have different requirements and available resources, and thus, an IDE choice for one device might not be appropriate for another even given the same project. For instance, a netbook has substantially different resource availability for running an IDE than does a full developer workstation with triple high-definition monitors.

SUMMARY

According to an embodiment of this disclosure, a computer-implemented method includes receiving a request from a user at a local machine to access a project. One or more programming languages used in the project are identified. Resource availability at the local machine is analyzed. An integrated development environment (IDE) is selected for the project, based at least in part on the one or more programming languages and the resource availability of the local machine. The IDE is provisioned automatically, by a computer processor, for the user in response to the request to access the project.

In another embodiment, a system includes a memory having computer readable instructions and one or more processors for executing the computer readable instructions. The computer readable instructions include receiving a request from a user at a local machine to access a project. Further according to the computer readable instructions, one or more programming languages used in the project are identified. Resource availability at the local machine is analyzed. An integrated development environment (IDE) is selected for the project, based at least in part on the one or more programming languages and the resource availability of the local machine. The IDE is provisioned automatically for the user in response to the request to access the project.

In yet another embodiment, a computer program product for setting up a development environment includes a computer readable storage medium having program instructions embodied therewith. The program instructions are executable by a processor to cause the processor to perform a method. The method includes receiving a request from a user at a local machine to access a project. Further according to the method, one or more programming languages used in the project are identified. Resource availability at the local machine is analyzed. An integrated development environment (IDE) is selected for the project, based at least in part on the one or more programming languages and the resource availability of the local machine. The IDE is provisioned automatically for the user in response to the request to access the project.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

According to this disclosure, a setup system may provide dynamic setup of an environment in which a user can work on a project. When the user initially attempts to open a codebase, the setup system may analyze the codebase and the local machine's resources to determine which integrated development environment (IDE), target platform, and compiler settings to use. Further, in some embodiments, the setup system may provision the components needed for the user to effectively work on the project. In short, embodiments of the setup system may take much of the guesswork out of setting up a development environment, and may do so in the background without the user having to make difficult decisions.

Figure 1:
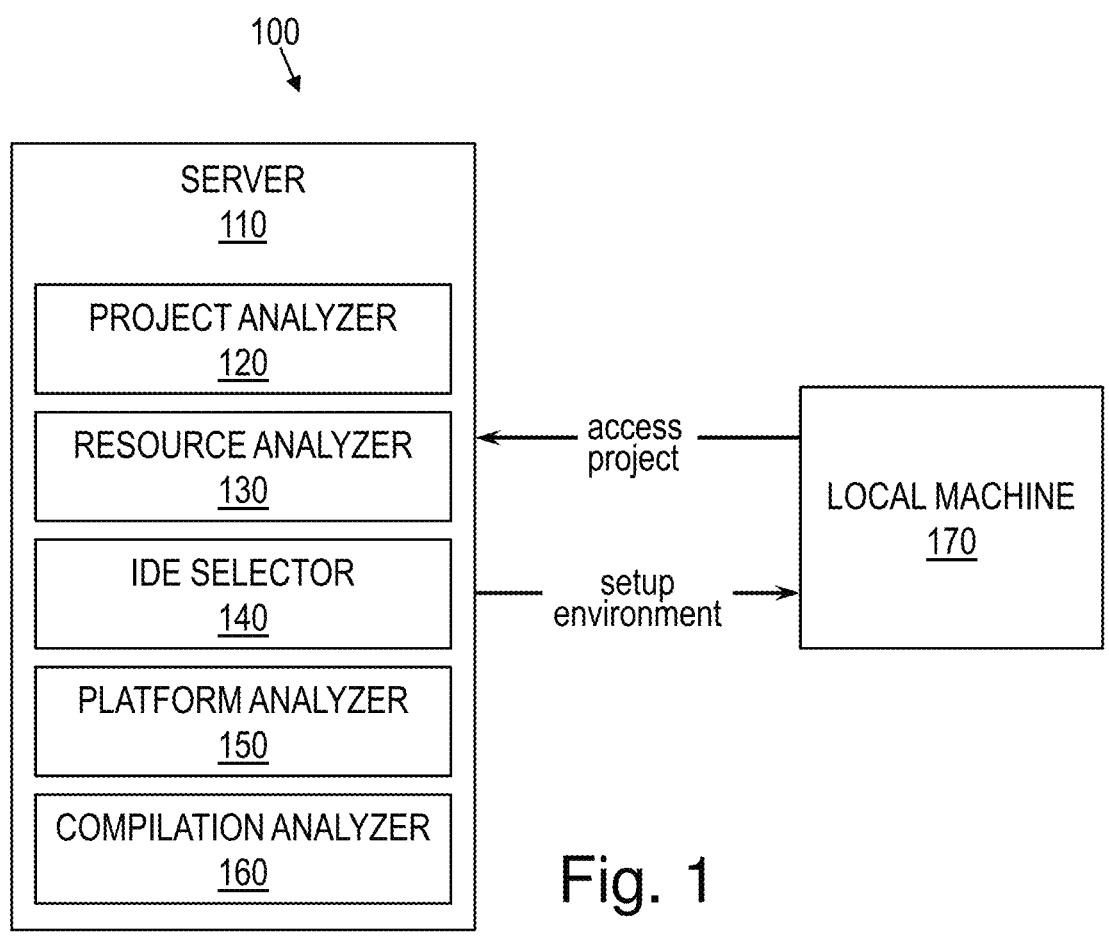
FIG. 1 is a block diagram of a setup system, according to some embodiments of this disclosure.

FIG. 1 is a block diagram of a setup system 100, according to some embodiments of this disclosure. As shown, the setup system 100 may include a server 110, which may include a project analyzer 120, a resource analyzer 130, an IDE selector 140, a platform analyzer 150, and a compilation analyzer 160. Further the server 110 may store or have access to storage of one or more codebases. Generally, the project analyzer 120 may analyze a codebase of a project requested by a user at a local machine 170; the resource analyzer 130 may analyze resource availability on the user's local machine; the IDE selector 140 may select an IDE to be used for the project and may begin provisioning an environment for the project; the platform analyzer 150 may select a target platform for the project; and the compilation analyzer 160 may, as needed, repeatedly attempt to compile the codebase while modifying compiler settings until an acceptable result is found.

Each of the project analyzer 120, the resource analyzer 130, the IDE selector 140, the platform analyzer 150, and the compilation analyzer 160 may include hardware, software, or a combination of both. Further, although these component are illustrated in FIG. 1 as being distinct, the distinction is made for illustrative purposes only, and the project analyzer 120, the resource analyzer 130, the IDE selector 140, the platform analyzer 150, and the compilation analyzer 160 may share hardware, software, or both, or may be separated in a different manner than the one illustrated.

The setup system 100 may assist a user in making various decisions regarding a project and associated codebase for that project. To this end, the setup system 100 may consider, for example, resources of the user's local machine, project size, project language, and compiler settings on a target platform for the project. As a result, the user can save time on setup, thus allowing more time for the user to develop the project.

Figure 2:
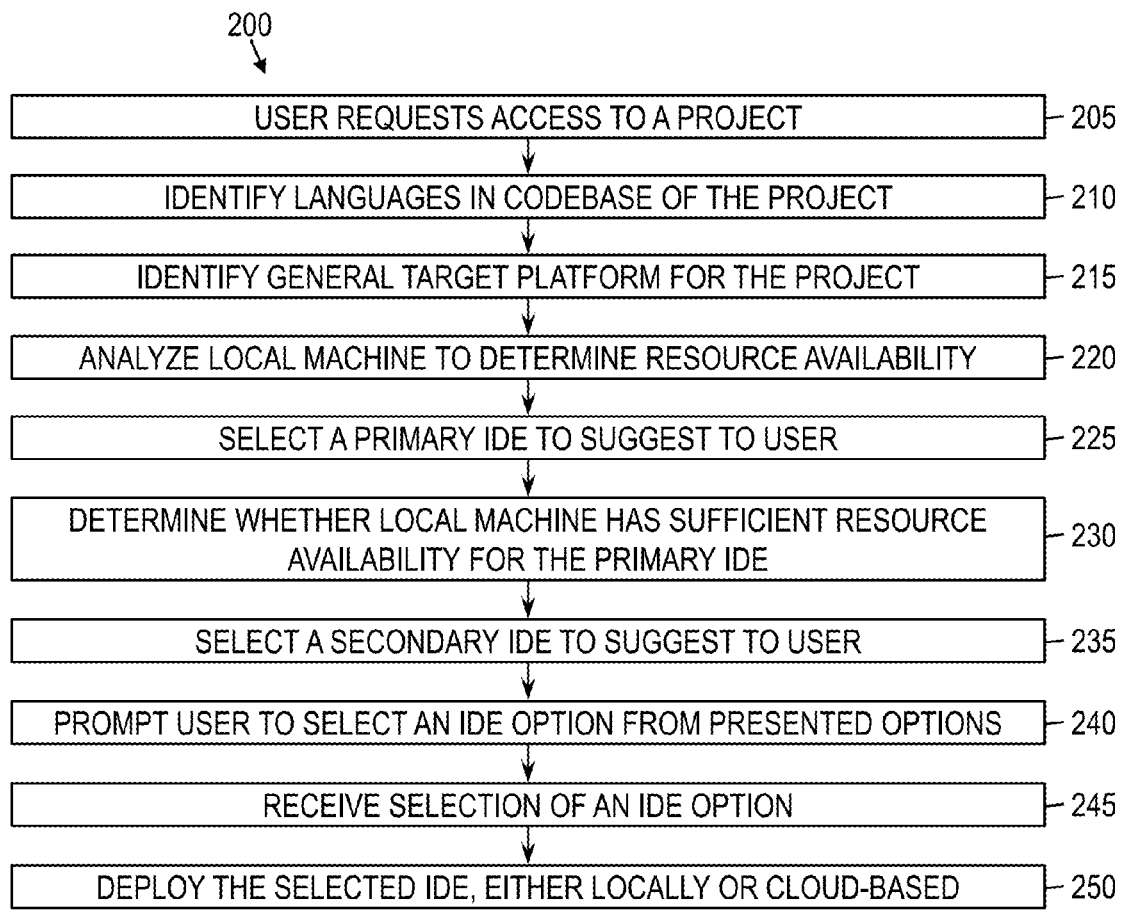
FIG. 2 is a flow diagram of a method for setting up a development environment for a project, according to some embodiments of this disclosure.

FIG. 2 is a flow diagram of a method for setting up a development environment for a project, according to some embodiments of this disclosure.

At block 205, a user at a local machine 170 may request access to an existing project. The project may be stored on, or otherwise accessible by, the server 110. For instance, this request may be in the form of an attempt to check out the project using a version-control system. Due to this request, the setup system 100 may provision an environment for the user to work on the project, as will be described below.

Upon detection of the request, the setup system 100 may analyze a codebase of the project requested. For instance, at block 210, the setup system 100 may identify one or more languages used in the codebase. This may be performed by reading the mime-type of one or more files in the project.

At block 215, the setup system 100 may identify a general target platform of the project. Generally, the target platform is a platform for which the project is being developed, and the target platform includes the plugins needed to run the project. For example, and not by way of limitation, the target platform may be a particular operating system, such as Linus, z/OS, or Windows. At this point, the setup system 100 need not be specific as to the version or build of the target platform. Rather, the setup system 100 may select a default version of the target platform to use temporarily. The identification of the target platform may be made based on the mime-types of one or more files in the project. For instance, if the project includes only code written in XCode, which works only on Macs, the Mac operating system may be identified as the target platform for that project. Analogously, if the project contains only Microsoft® Visual Studios project files, then Windows® may be identified.

In some embodiments, the project may be associated with metadata, which may indicate which IDEs and target platforms are supported by the project. In this case, that metadata may also be considered in selecting a target platform.

At block 220, the setup system 100 may analyze the local machine 170 to determine its available resources.

At block 225, the setup system 100 may select a primary IDE to be suggested to the user for the project. The selection of the primary IDE may be based on the one or more languages identified in the project, and the target platform previously selected, such that the IDE is compatible with each of those languages and the target platform. In some embodiments, the project's metadata may also be considered in selecting the primary IDE.

At block 230, the setup system 100 may determine whether the local machine 170 has sufficient available resources to run the primary IDE. To this end, the setup system 100 may have a store of knowledge about each IDE of which it is aware, and may thus be able to look up the required resource availability for the primary IDE. Additionally, due to the analysis performed at block 220, the setup system 100 may be aware of available resources on the local machine 170. Therefore, to determine whether the local machine 170 has sufficient available resources, the setup system 100 may compare the primary IDE's requirements to the local machine's resource availability.

At block 235, in some embodiments, the setup system 100 may additionally select a secondary IDE. The secondary IDE may offer a greater or fewer number of features than the primary IDE, and be selected to offer the user an alternative to the primary IDE. Like the primary IDE, the secondary IDE may be selected based on the one or more languages identified in the project and the target platform previously selected, such that the IDE is compatible with each of those languages and the selected operating system. Again, the project's metadata may also be considered in this selection.

In some embodiments, at block 240, the setup system 100 may prompt the user to choose an IDE from two or more available IDE options, which may include the primary IDE and the secondary IDE. The available IDE options may be based at least in part on the selections made at blocks 230 and 235, and they may include a cloud-based option as well as a local option.

Figure 3:
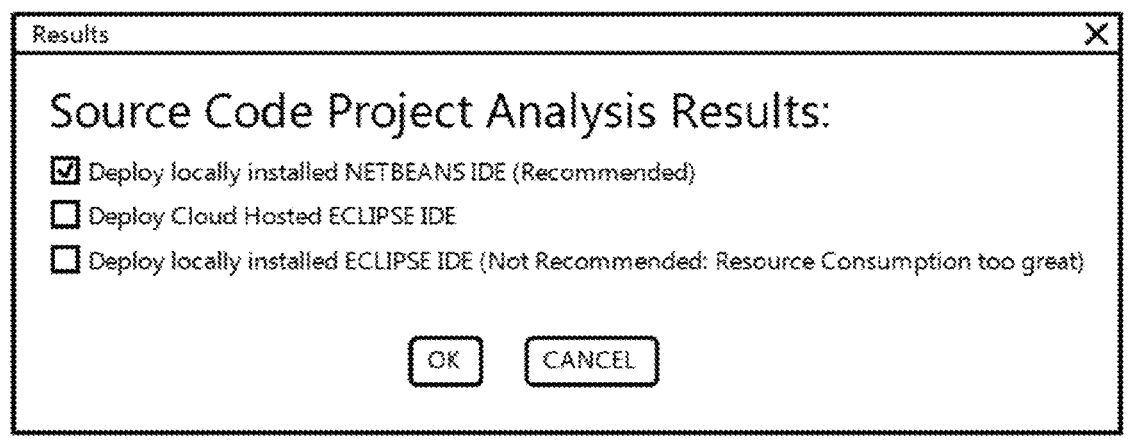
FIG. 3 illustrates an example of a prompt asking the user to select an integrated development environment (IDE) option, according to some embodiments of this disclosure.

For instance, if the local machine meets the resource requirements of the primary IDE, deploying a locally installed version of the primary IDE may be provided as an IDE option. In that case, deploying a cloud-based version of the secondary IDE, which may provide additional features as compared to the primary IDE, may be provided as an option as well. Deploying a locally installed version of the secondary IDE may also be provided as an option, but in that case, the setup system 100 may indicate that this option is not recommended due to resource requirements of the secondary IDE. FIG. 3 illustrates an example of such a prompt asking the user to select an IDE option, according to some embodiments of this disclosure. In this case, NetBeans is the primary IDE, and the local machine 170 has sufficient resources available to run it. The secondary IDE in this example is Eclipse.

Alternatively, for instance, if the local machine does not meet the resource requirements of the primary IDE, deploying a cloud-hosted version of the primary IDE may be provided as an option. In that case, deploying a locally installed version of the secondary IDE may be provided as an option as well. Deploying a locally installed version of the primary IDE may also be provided as an option, but in that case, the setup system 100 may indicate that this option is not recommended due to the primary IDE's requirements.

Referring back to FIG. 2, at block 245, a selection of an IDE option may be received from the user, and at block 250, the selected IDE may be deployed. If the selected IDE is cloud-based, the setup system 100 may provision the selected IDE on a cloud provider and may return to the user an IP address and, if applicable, credentials for accessing the selected IDE on the cloud provider. Further, if the IDE is cloud-based, the setup system 100 may copy the codebase for the project to the cloud provider of the IDE as part of this provisioning.

Thus, the setup system 100 may assist the user in selecting and provisioning and IDE appropriate for the project.

Some embodiments of the setup system 100 may go further than described above and continue to automated environment setup outside of just the IDE. If no further setup is performed, the user may still have access to the metadata associated with the project, which may provide some, but limited, compiler information and target platform information.

Figure 4:
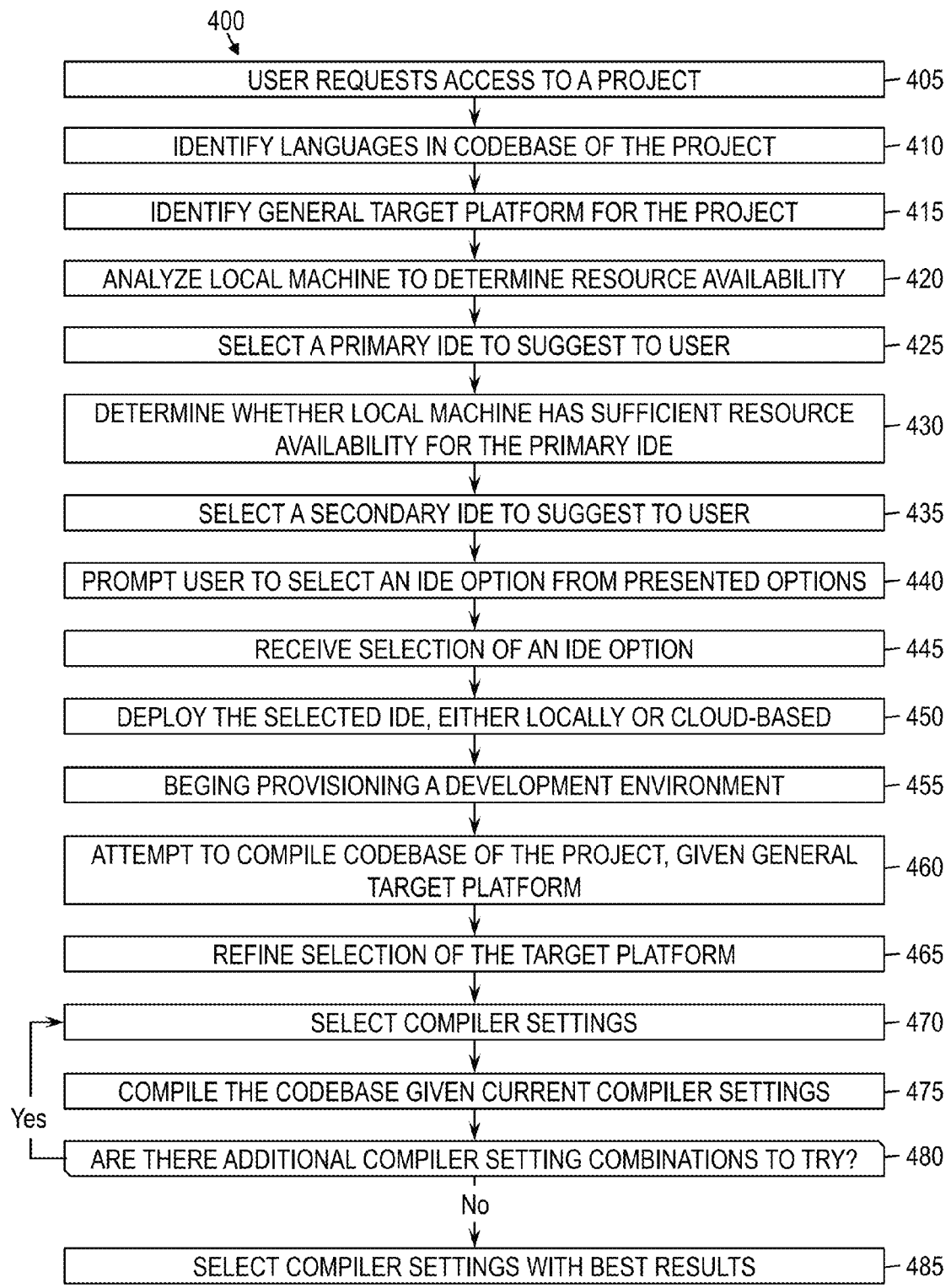
FIG. 4 is another flow diagram of a method for setting up a development environment for a project, according to some embodiments of this disclosure.

FIG. 4 is another flow diagram of a method 400 for setting up a development environment for a project, according to some embodiments of this disclosure. As shown, blocks 405 to 450 of FIG. 4 may mirror blocks 205 through 250 of FIG. 2. However, as shown in FIG. 4, additional operations may be performed related to the target platform and compiler, leading to further setup and refinement of the development environment.

At block 455, the setup system 100 may begin provisioning a development environment for the project, based at least in part on the information gathered so far. This may include provisioning middleware needed for the project. For instance, if the codebase references a database or web component, the setup system 100 may obtain that database or web component, or may obtain cloud access to the database or web component as needed.

After the IDE is set up, at block 460, the setup system 100 may attempt to compile the codebase within the IDE given the selection of the target platform made at block 410. It is likely that a number of fault indicators (e.g., warnings and errors) will result from the compilation, and these may be indicative of whether the version of the target platform used is appropriate for the project. An incorrect choice in target platform can cause more compiler errors than compiler settings. Thus, the setup system 100 may refine the choice of target platform before addressing the compiler settings. At block 465, the setup system 100 may refine the selection of the target platform based on the fault indicators. For instance, although only an operating system may have been chosen at block 410, at block 465, the setup system 100 may also select a version and build of the operating system. In some embodiments, this selection may be directed toward reducing the quantity or severity of the fault indicators.

With a target platform having been chosen, the setup system 100 may now seek to select compiler settings being used for the project. This selection may be based in part on compiler preferences, which may be default preferences or user preferences, of which compiler fault indicators are acceptable. For instance, the preferences may indicate that warnings are acceptable but errors are to be avoided, or the preferences may indicate that only certain types of warnings are acceptable.

Figure 5:
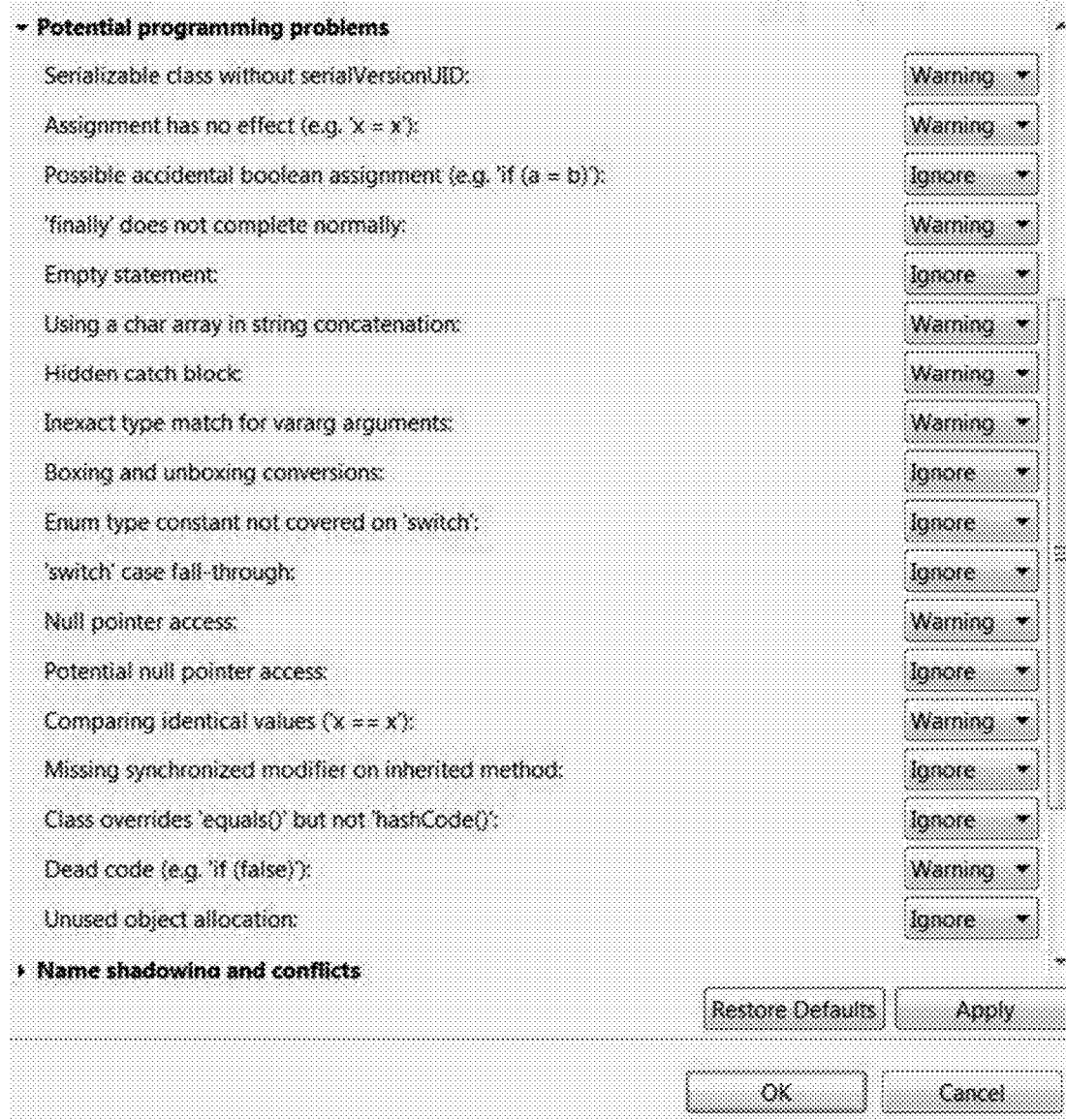
FIG. 5 illustrates an example set of selectable compiler settings, according to some embodiments of this disclosure.

At block 470, the setup system 100 may select settings for the compiler. FIG. 5 illustrates an example set of selectable compiler settings, according to some embodiments of this disclosure. As shown, one or more settings may be available, and each setting may have one or more selectable options. As discussed below, the setup system 100 may end up performing this block 470 multiple times. Through these iterations, various combinations of setting selections may be made, where each combination yields a set of compiler settings. In some embodiments, the selection system 100 may initially (i.e., in the first iteration) set each setting to the strictest option, which may be likely to provide more fault indicators than other options. Through the various iterations, other sets of compiler settings may be tried. In some embodiments, each set of compiler settings available may be tried over the iterations.

At block 475, the setup system 100 may compile the codebase given the compiler settings selected at block 470, which may result in a set of fault indicators. A description of these fault indicators may be stored in association with the current compiler settings, for later reference.

At decision block 480, it may be determined whether there is a set of compiler settings that has not yet been tried. If such a set exists, then the method 400 may return to block 470, where a set of compiler settings not yet tried may be selected.

However, if all sets of compiler settings have been tried, then at block 485, the setup system 100 may select a set of compiler settings that yielded the best results. The definition of "best results" may be implementation-dependent. In some embodiments, for instance, the setup system 100 select a set of compiler settings that led to a least number (e.g., zero) of unacceptable fault indicators, where the compiler preferences define which fault indicators are deemed acceptable. From among those with the least number of unacceptable fault indicators, the setup system 100 may select as the best results a set of compiler settings with a least number of acceptable fault indicators. The setup system 100 may return the compiler to the compiler settings selected as having the best results. In some embodiments, these selected compiler settings may be made available to the user for review and modification.

At this point, the user's development environment may be fully set up, and the user may be able to begin using the development environment to work on the project.

Figure 6:
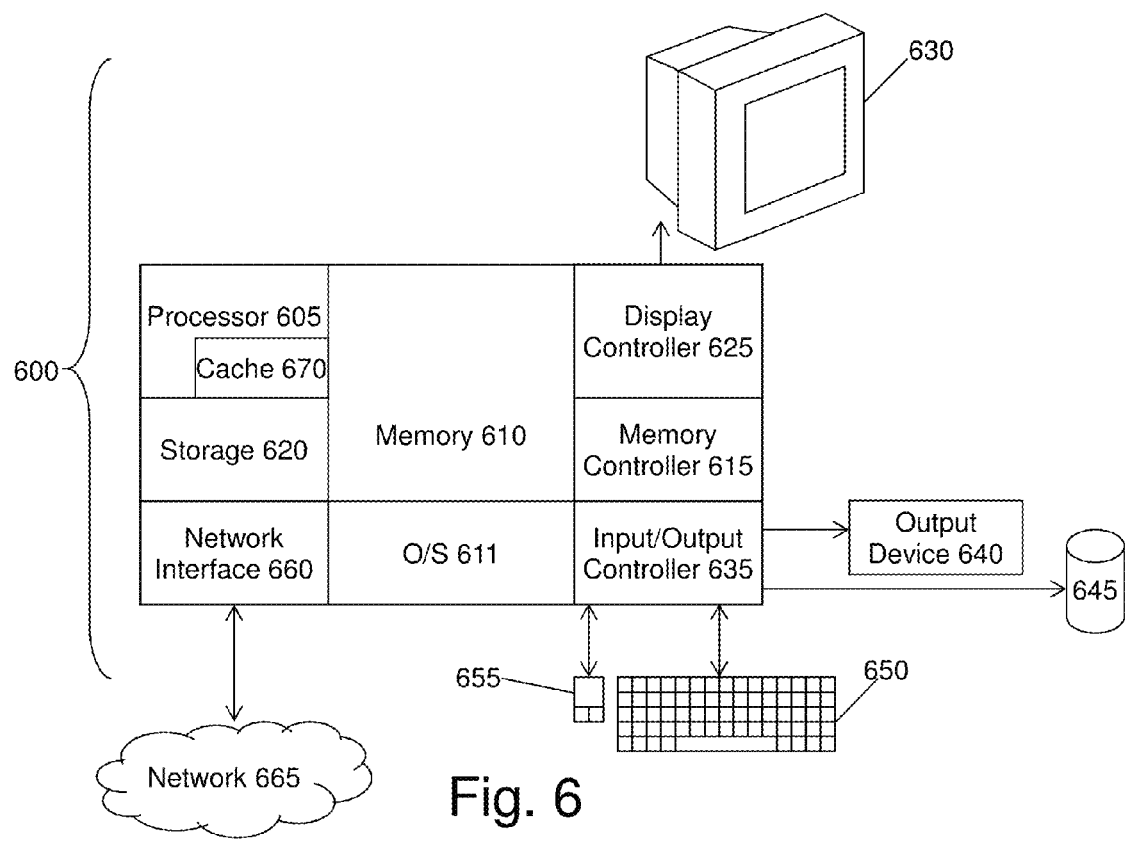
FIG. 6 is a block diagram of a computer system for implementing some or all aspects of the setup system, according to some embodiments of this disclosure.

FIG. 6 illustrates a block diagram of a computer system 600 for use in implementing a setup system 100 or method according to some embodiments. The setup systems 100 and methods described herein may be implemented in hardware, software (e.g., firmware), or a combination thereof. In some embodiments, the methods described may be implemented, at least in part, in hardware and may be part of the microprocessor of a special or general-purpose computer system 600, such as a personal computer, workstation, minicomputer, or mainframe computer. For instance, the local machine 170 and the server 110 may be computer systems 600.

In some embodiments, as shown in FIG. 6, the computer system 600 includes a processor 605, memory 610 coupled to a memory controller 615, and one or more input devices 645 and/or output devices 640, such as peripherals, that are communicatively coupled via a local I/O controller 635. These devices 640 and 645 may include, for example, a printer, a scanner, a microphone, and the like. Input devices such as a conventional keyboard 650 and mouse 655 may be coupled to the I/O controller 635. The I/O controller 635 may be, for example, one or more buses or other wired or wireless connections, as are known in the art. The I/O controller 635 may have additional elements, which are omitted for simplicity, such as controllers, buffers (caches), drivers, repeaters, and receivers, to enable communications.

The I/O devices 640, 645 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 605 is a hardware device for executing hardware instructions or software, particularly those stored in memory 610. The processor 605 may be a custom made or commercially available processor, a central processing unit (CPU), an auxiliary processor among several processors associated with the computer system 600, a semiconductor based microprocessor (in the form of a microchip or chip set), a macroprocessor, or other device for executing instructions. The processor 605 includes a cache 670, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 670 may be organized as a hierarchy of more cache levels (L1, L2, etc.).

The memory 610 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 610 may incorporate electronic, magnetic, optical, or other types of storage media. Note that the memory 610 may have a distributed architecture, where various components are situated remote from one another but may be accessed by the processor 605.

The instructions in memory 610 may include one or more separate programs, each of which comprises an ordered listing of executable instructions for implementing logical functions. In the example of FIG. 6, the instructions in the memory 610 include a suitable operating system (OS) 611. The operating system 611 essentially may control the execution of other computer programs and provides scheduling, input-output control, file and data management, memory management, and communication control and related services.

Additional data, including, for example, instructions for the processor 605 or other retrievable information, may be stored in storage 620, which may be a storage device such as a hard disk drive or solid state drive. The stored instructions in memory 610 or in storage 620 may include those enabling the processor to execute one or more aspects of the setup systems 100 and methods of this disclosure.

The computer system 600 may further include a display controller 625 coupled to a display 630. In some embodiments, the computer system 600 may further include a network interface 660 for coupling to a network 665. The network 665 may be an IP-based network for communication between the computer system 600 and an external server, client and the like via a broadband connection. The network 665 transmits and receives data between the computer system 600 and external systems. In some embodiments, the network 665 may be a managed IP network administered by a service provider. The network 665 may be implemented in a wireless fashion, e.g., using wireless protocols and technologies, such as WiFi, WiMax, etc. The network 665 may also be a packet-switched network such as a local area network, wide area network, metropolitan area network, the Internet, or other similar type of network environment. The network 665 may be a fixed wireless network, a wireless local area network (LAN), a wireless wide area network (WAN) a personal area network (PAN), a virtual private network (VPN), intranet or other suitable network system and may include equipment for receiving and transmitting signals.

Setup systems 100 and methods according to this disclosure may be embodied, in whole or in part, in computer program products or in computer systems 600, such as that illustrated in FIG. 6.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
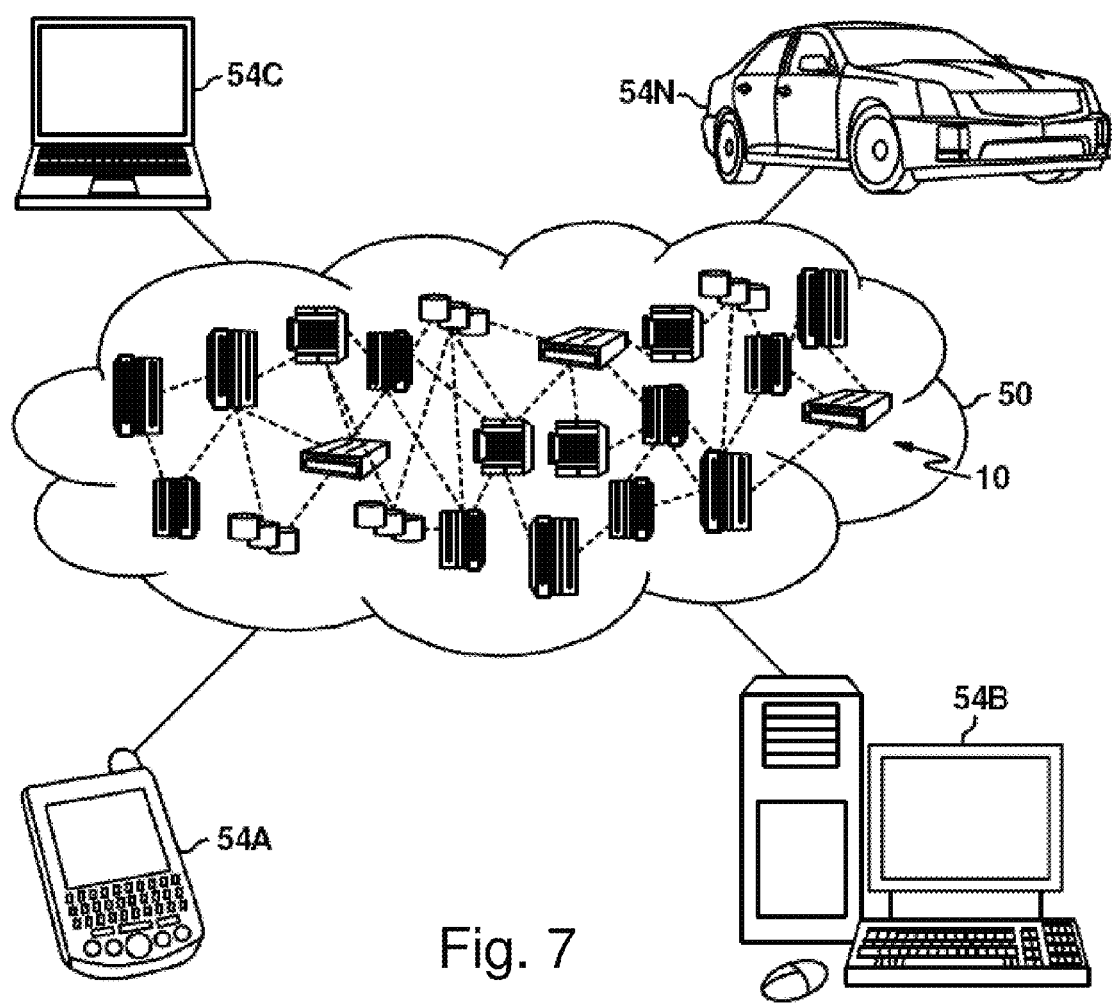
FIG. 7 depicts a cloud computing environment, according to some embodiments of this disclosure.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
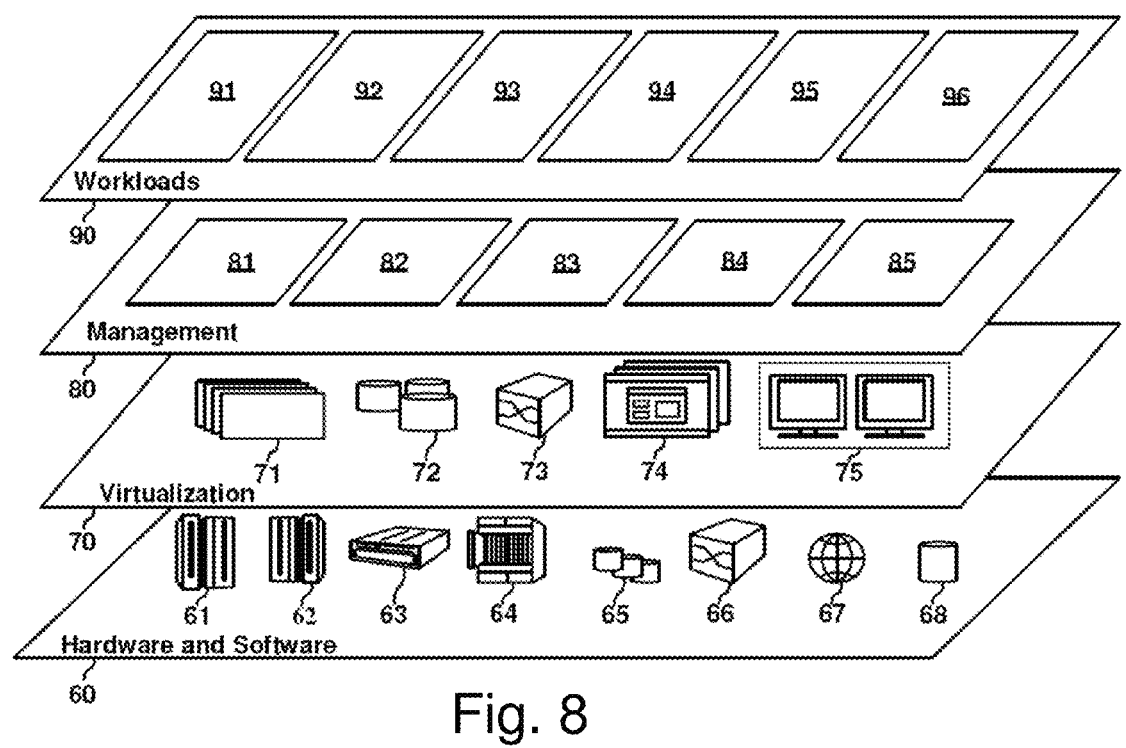
FIG. 8 depicts abstraction model layers, according to some embodiments of this disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing cloud-based IDEs 96.

Technical effects and benefits of some embodiments include taking much the guesswork out of setting up a development environment for a project being opened by a user. The development environment may be selected and configured to support the project, thus enabling the project to compile and run more effectively.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
a memory having computer readable instructions; and
one or more processors for executing the computer readable instructions, the computer readable instructions comprising:
receiving a request from a user at a local machine to access a project;
identifying one or more programming languages used in the project;
analyzing resource availability on the local machine;
selecting an integrated development environment (IDE) for the project, based at least in part on the one or more programming languages and the resource availability of the local machine; and
automatically provisioning the IDE for the user in response to the request to access the project.

2. The system of claim 1, wherein the selecting the IDE for the project comprises:
selecting a first IDE, based at least in part on the one or more programming languages;
selecting a second IDE requiring greater resources than the first IDE, based at least in part on the one or more programming languages;
offering to the user a first option of deploying the first IDE locally; and
offering to the user a second option of deploying the second IDE in a cloud.

3. The system of claim 1, the computer readable instructions further comprising selecting a general target platform for the project, based at least in part on a codebase of the project, wherein the selecting the IDE for the project is based at least in part on the general target platform.

4. The system of claim 3, the computer readable instructions further comprising:
compiling the project;
receiving one or more fault indicators during compilation of the project; and
refining the general target platform to a specific target platform based on the one or more fault indicators.

5. The system of claim 1, the computer readable instructions further comprising:
determining a set of temporary compiler settings for a compiler of the project in the IDE;
compiling the project based on the set of temporary compiler settings;
receiving a set of fault indicators associated with the set of temporary compiler settings; and
repeating the determining the set of temporary compiler settings and compiling the project for a plurality of distinct sets of temporary compiler settings.

6. The system of claim 5, the computer readable instructions further comprising selecting compiler settings from among the plurality of distinct sets of temporary compiler settings, based at least in part on the set of fault indicators associated with each of the plurality of distinct sets of temporary compiler settings.

7. The system of claim 6, wherein the selecting the compiler settings from among the plurality of distinct sets of temporary compiler settings comprises:
receiving preferences regarding which fault indicators are acceptable and which fault indicators are unacceptable; and
selecting from among the plurality of distinct sets of temporary compiler settings a set of temporary compiler settings that has the least number of unacceptable fault indicators in the set of fault indicators associated with the set of temporary compiler settings, based on the preferences.

8. A computer program product for setting up a development environment, the computer program product comprising a computer readable storage medium having program instructions embodied therewith, the program instructions executable by a processor to cause the processor to perform a method comprising:
receiving a request from a user at a local machine to access a project;
identifying one or more programming languages used in the project;
analyzing resource availability on the local machine;
selecting an integrated development environment (IDE) for the project, based at least in part on the one or more programming languages and the resource availability of the local machine; and
automatically provisioning the IDE for the user in response to the request to access the project.

9. The computer program product of claim 8, wherein the selecting the IDE for the project comprises:
selecting a first IDE, based at least in part on the one or more programming languages;
selecting a second IDE requiring greater resources than the first IDE, based at least in part on the one or more programming languages;
offering to the user a first option of deploying the first IDE locally; and
offering to the user a second option of deploying the second IDE in a cloud.

10. The computer program product of claim 8, the method further comprising selecting a general target platform for the project, based at least in part on a codebase of the project, wherein the selecting the IDE for the project is based at least in part on the general target platform.

11. The computer program product of claim 10, the method further comprising:
compiling the project;
receiving one or more fault indicators during compilation of the project; and
refining the general target platform to a specific target platform based on the one or more fault indicators.

12. The computer program product of claim 8, the method further comprising:
determining a set of temporary compiler settings for a compiler of the project in the IDE;
compiling the project based on the set of temporary compiler settings;
receiving a set of fault indicators associated with the set of temporary compiler settings; and
repeating the determining the set of temporary compiler settings and compiling the project for a plurality of distinct sets of temporary compiler settings.

13. The computer program product of claim 12, the method further comprising selecting compiler settings from among the plurality of distinct sets of temporary compiler settings, wherein the selecting the compiler settings from among the plurality of distinct sets of temporary compiler settings comprises:
  receiving preferences regarding which fault indicators are acceptable and which fault indicators are unacceptable; and
  selecting from among the plurality of distinct sets of temporary compiler settings a set of temporary compiler settings that has the least number of unacceptable fault indicators in the set of fault indicators associated with the set of temporary compiler settings, based on the preferences.

\* \* \* \* \*